(12) United States Patent
Rudland et al.

(10) Patent No.: US 10,051,541 B2
(45) Date of Patent: Aug. 14, 2018

(54) CHANNEL CHANGE DECISION MECHANISM AND METHOD FOR A WIRELESS NETWORK

(75) Inventors: Philip Andrew Rudland, Horley (GB); Immo Benjes, Redhill (GB)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 708 days.

(21) Appl. No.: 12/600,748

(22) PCT Filed: May 20, 2008

(86) PCT No.: PCT/IB2008/051980
§ 371 (c)(1),
(2), (4) Date: Nov. 18, 2009

(87) PCT Pub. No.: WO2008/146196
PCT Pub. Date: Dec. 4, 2008

(65) Prior Publication Data
US 2010/0165861 A1     Jul. 1, 2010

Related U.S. Application Data

(60) Provisional application No. 60/940,158, filed on May 25, 2007.

(51) Int. Cl.
*H04W 36/30* (2009.01)
*H04W 36/26* (2009.01)

(52) U.S. Cl.
CPC ............ *H04W 36/30* (2013.01); *H04W 36/26* (2013.01)

(58) Field of Classification Search
CPC ...... H04W 36/24; H04W 36/26; H04W 36/30
(Continued)

(56) References Cited

U.S. PATENT DOCUMENTS 7,720,086 B2 * 5/2010 Wu et al. ................. 370/436
8,194,599 B2 * 6/2012 Marinier et al. ......... 370/329
(Continued)

FOREIGN PATENT DOCUMENTS

EP       1761086 A1    3/2007
KR    2006064485 A    6/2006
(Continued)

OTHER PUBLICATIONS

Sheu et al., Smart Handoff Scheme for Supporting Roaming between WLAN and GPRS Networks, 2004, pp. 3004-3008.
(Continued)

*Primary Examiner* — Michael Thier
*Assistant Examiner* — Feben Haile (57) ABSTRACT

In a communication network (100) comprising a plurality of wireless devices (120), a method determines whether to change one or more communication channels over which the wireless devices (120) communicate. The method includes receiving a plurality of configuration parameters for the communication network (100); receiving information related to one or more communication channel's availability for communications by one or more of the wireless devices (120); and determining whether to change one or more communication channels over which the wireless devices (120) communicate by executing a communication channel change determination algorithm using the configuration parameters and the received information related to one or more communication channel's availability for communications by one or more of the wireless devices (120).

17 Claims, 3 Drawing Sheets

(58) Field of Classification Search
USPC ....... 370/241, 252, 328, 329, 431, 436, 464, 370/465
See application file for complete search history.

(56) References Cited

U.S. PATENT DOCUMENTS

| | | | |
|---|---|---|---|
| 2002/0017567 A1* | 2/2002 | Connolly | G04B 47/00 235/472.02 |
| 2004/0077352 A1* | 4/2004 | Mahany | 455/448 |
| 2007/0104139 A1 | 5/2007 | Marinier | |
| 2007/0258395 A1* | 11/2007 | Jollota et al. | 370/310 |

FOREIGN PATENT DOCUMENTS

| | | |
|---|---|---|
| KR | 100653368 B1 | 12/2006 |
| WO | 2005010214 A2 | 2/2005 |
| WO | 2007050704 A2 | 5/2007 |
| WO | 2007141451 A2 | 12/2007 |

OTHER PUBLICATIONS

Wenlei, Wang et al "A New Vertical Handoff Solution in Heterogeneous Wireless Networks based on Load Balance", Mar. 2007.

* cited by examiner

CHANNEL CHANGE DECISION MECHANISM AND METHOD FOR A WIRELESS NETWORK

TECHNICAL FIELD

This invention pertains to wireless devices and wireless networks, and more specifically to gathering data about the conditions of communication channels for a wireless device, and reporting the data to a wireless network.

BACKGROUND AND SUMMARY

Wireless networks are increasingly commonly employed to provide enhanced capabilities for a variety of devices. One category of wireless networks is a wireless Personal Area Network (PAN). One suitable format for communications in a wireless PAN is described by the ZigBee Specification for low cost, low power wireless radio links, as defined by the ZigBee Alliance. ZigBee wireless PANs are especially suitable for use, for example, in home automation networks for controlling lights, security systems, fire alarms, heating-ventilation-and-air-conditioning (HVAC) systems, etc.

Figure 1:
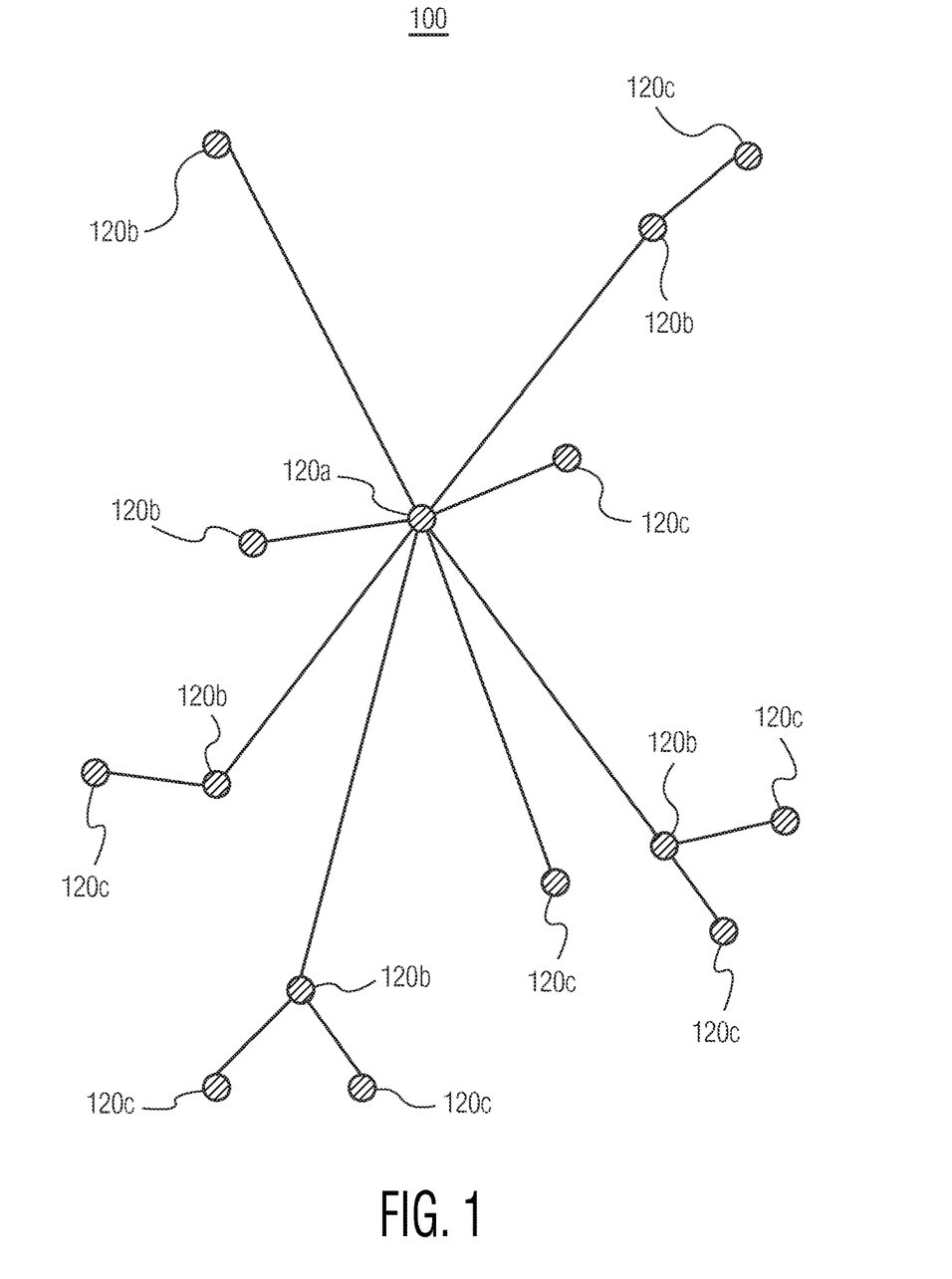
FIG. 1 shows one embodiment of a wireless network including a plurality of wireless devices.

FIG. 1 shows one exemplary embodiment of a wireless network 100 including a plurality of wireless devices 120. Wireless network 100 may be a ZigBee wireless PAN. In the wireless network 100, wireless devices 120 are classified into three different categories: PAN Coordinator 120a, Routers 120b, and End Devices 120c. In the context of a ZigBee wireless PAN, each of these wireless devices 120 is also sometimes referred to as a "node."

Each ZigBee wireless network includes a PAN Coordinator 120a. PAN Coordinator 120a is the ZigBee device responsible for starting the formation of the wireless network 100. PAN Coordinator 120a is able to store information about the wireless network 100 (e.g., security keys). PAN Coordinator 120a chooses for itself a PAN ID, and conventionally has a ZigBee address of 0.

Wireless network 100 may include a plurality of Routers 120b. Router 120b has the capability to pass data from one wireless device 120 to another wireless device 120, and may also act as a source and destination for data communications.

In contrast, End Device 120c includes just enough functionality to communicate with its "parent node"—which may be either a Router 120b or PAN Coordinator 120a. End Device 120c cannot directly pass messages between two other wireless devices 120. Accordingly, End Device 120c requires the least amount of memory and therefore in general can be manufactured at a lower cost than PAN Coordinator 120a or Router 120b.

In a ZigBee wireless PAN, communication between nodes 120 takes place over one of a number of "physical channels." ZigBee wireless PANs and wireless devices employ functionality described in IEEE Standard 802.15.4. IEEE 802.15.4 has two physical (PHY) layers that operate in respective upper and lower frequency ranges: 868/915 MHz and 2.4 GHz. The lower frequency PHY layer covers both the 868 MHz European band and the 915 MHz band, used in countries such as the United States and Australia. The higher frequency PHY layer is used virtually worldwide.

The 2.4 GHz communications band contains 16 separate IEEE 802.15.4 channels, so a number of ZigBee wireless PANs can operate simultaneously, with each operating on its own channel(s), thereby not interfering with each other. It is possible for more than one ZigBee wireless PAN to use a single channel, especially if they are separated by a long distance (>10-100 m away), or if both have fairly low usage rates (low duty cycle).

Other devices (e.g., so-called "WiFi" devices) also operate in the 2.4 GHz band, and WiFi traffic can interfere with ZigBee traffic. WiFi messages can be transmitted at a much higher power level than ZigBee messages, and a WiFi channel is as wide in bandwidth as several ZigBee channels. In order for two such systems to coexist it is beneficial to be able to work out which channels are clear, and to get the interfered-with network (e.g. the ZigBee wireless PAN) to operate on these clear channels.

Patent application WO IB2007/050704, which is incorporated herein by reference, describes a mechanism for reporting when an interference problem has been detected, such that some node 120, typically PAN Coordinator 120a, would be able to select a better channel on which to operate wireless network 100. It also discloses the possibility that PAN Coordinator 120a, on receiving an interference report from some other node 120 in wireless network 100, would request further nodes 120 to carry out an assessment of the local channel conditions, and report these back, further improving the likelihood of selecting a globally "good" channel.

Additionally, U.S. patent application 60/886,419 filed on 25 Jan. 2007 discloses improvements to the mechanism by which networked devices 120 assess locally how good or bad a channel is, and to how these are reported back to a central node 120 (e.g., PAN Coordinator 120a).

In that case, PAN Coordinator 120a has access to a lot of useful information, and options about what it can do to affect the performance of wireless network 100.

The problem that PAN Coordinator 120a has then is how to decide on what it should base its decision as to what to do with the information. In theory, PAN Coordinator 120a should decide what is "best" for wireless network 100. However, this problem is complicated by the nature of interferers to wireless network 100. Some interferers completely block out transmission on a channel, but many other interferers may just reduce the usable bandwidth of the channel. Also a given interferer affects messages between different pairs of networked nodes 120 differently, for instance a distant high duty cycle interferer might block reception of almost all messages from distant nodes 120 completely, but hardly affect nearby nodes 120 at all.

Given that in many cases it is not possible to have all nodes 120 running in an environment completely free of any interference, a problem arises as to what the "optimal" situation is that PAN Coordinator 120a should try to achieve, and on what criteria it should base its trade-off decisions.

Accordingly, it would be desirable to provide a method of employing channel condition estimates in order to make a decision as to whether or not to change one or more channels on which a wireless network communicates. It would further be desirable to provide a device for deciding whether or not to change one or more channels on which a wireless network communicates based on estimates of channel interference for one or more wireless devices in the wireless network.

In one aspect of the invention, in a communication network comprising a plurality of wireless devices, a method is provided for determining whether to change one or more communication channels over which the wireless devices communicate. The method comprises: receiving an indication of a selected operating mode for the communication network among a plurality of available operating modes, each operating mode having associated therewith a different communication channel change determination algorithm uniquely corresponding to that operating mode; receiving information related to one or more communication channel's availability for communications by one or more of the wireless devices; and determining whether to change one or more communication channels over which the wireless devices communicate by executing the communication channel change determination algorithm corresponding to the selected operating mode, using the received information related to one or more communication channel's availability for communications by one or more of the wireless devices.

In another aspect of the invention, in a communication network comprising a plurality of wireless devices, a method is provided for determining whether to change one or more communication channels over which the wireless devices communicate. The method comprises: receiving a plurality of configuration parameters for the communication network; receiving information related to one or more communication channel's availability for communications by one or more of the wireless devices; and determining whether to change one or more communication channels over which the wireless devices communicate by executing a communication channel change determination algorithm using the configuration parameters and the received information related to one or more communication channel's availability for communications by one or more of the wireless devices.

In a further aspect of the invention, in a communication network comprising a plurality of wireless devices, a device is provided for determining whether to change one or more communication channels over which the wireless devices communicate. The device comprises: means for receiving an indication of a selected operating mode for the communication network among a plurality of available operating modes, each operating mode having associated therewith a different communication channel change determination algorithm uniquely corresponding to that operating mode; means for receiving information related to one or more communication channel's availability for communications by one or more of the wireless devices; and means for determining whether to change one or more communication channels over which the wireless devices communicate by executing the communication channel change determination algorithm corresponding to the selected operating mode, using the received information related to one or more communication channel's availability for communications by one or more of the wireless devices.

In yet another aspect of the invention, in a communication network comprising a plurality of wireless devices, a device determines whether to change one or more communication channels over which the wireless devices communicate. The device comprises: means for receiving a plurality of configuration parameters for the communication network; means for receiving information related to one or more communication channel's availability for communications by one or more of the wireless devices; and means for determining whether to change one or more communication channels over which the wireless devices communicate by executing a communication channel change determination algorithm using the configuration parameters and the received information related to one or more communication channel's availability for communications by one or more of the wireless devices.

DETAILED DESCRIPTION

The present invention will now be described more fully hereinafter with reference to the accompanying drawing figures, in which preferred embodiments of the invention are shown. This invention may, however, be embodied in different forms and should not be construed as limited to the embodiments set forth herein. Rather, these embodiments are provided as teaching examples of the invention.

Figure 2:
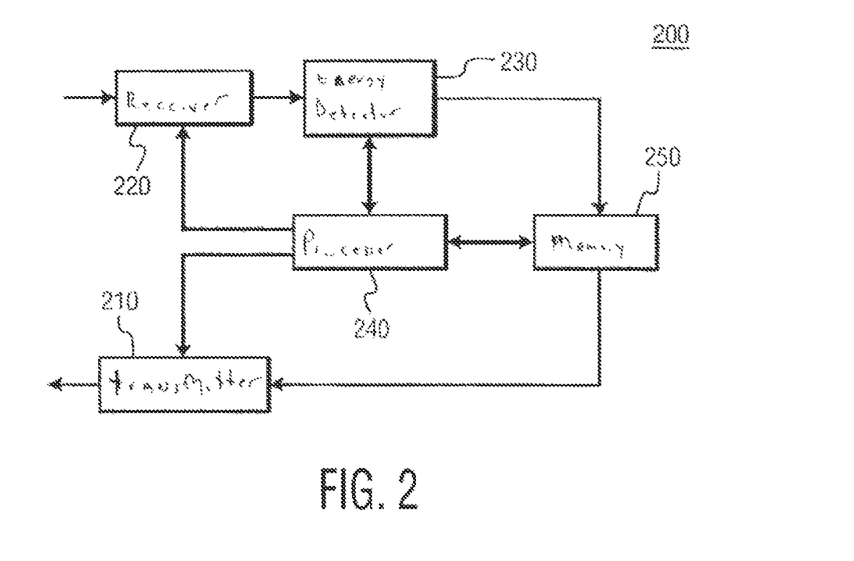
FIG. 2 shows a functional diagram of one embodiment of a wireless device for a wireless network.

FIG. 2 shows a functional diagram of one embodiment of a wireless device 200, which may be employed as a wireless device 120 in wireless network 100 of FIG. 1. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes transmitter 210, receiver 220, energy detector 230, processor 240, and memory 250. Processor 240 is configured to execute one or more software algorithms in conjunction with memory 250 to supply data to, to receive data from, and/or to control operations of transmitter 210, receiver 220, and/or energy detector 230. Beneficially, processor 240 includes its own memory (e.g., nonvolatile memory) for storing executable software code that allows it to control operations of transmitter 210, receiver 220, and/or energy detector 230. Alternatively, executable code may be stored in designated memory locations within memory 250. Also, although processor 240 is shown in FIG. 2 as a distinct element for illustration purposes, in an actual physical realization one or more processors or controllers may be embedded within transmitter 210, receiver 220, and/or energy detector 230 and may cooperate with each other to perform operations of wireless device 200, described below as performed by processor 240.

Wireless device 200 is adapted to communicate selectively in one or more of a plurality of communication channels, for example communication channels specified by the ZigBee specification in the 800/900 MHz band and the 2.4 GHz band. In this context, a communication channel comprises a defined portion of the frequency spectrum. In that case, receiver 220 may receive messages, which may include payload data, from other wireless devices over one or more selected communication channels in accordance with the protocols of the wireless network (e.g., a ZigBee wireless PAN). Similarly, transmitter 210 is adapted to transmit messages, which may include payload data, to other wireless devices in accordance with the protocols of the wireless network (e.g., a ZigBee wireless PAN). In some embodiments, wireless device 200 may operate as a Router which may relay messages or data from one wireless device to another wireless device, by receiving the messages or data from a first wireless device via receiver 220, and then retransmitting the messages or data to a second wireless device via transmitter 210.

Beneficially, wireless device 200 is adapted to gather data regarding the availability of the communication channels on which it is adapted to operate. Such data collection may be initiated in response to one or more messages received from another wireless device, for example a message originated by a central node (e.g., PAN Coordinator 120a) in a wireless network in which wireless device 200 is operating. The message(s) may request that wireless device 200 conduct an assessment of local communication channel conditions. Furthermore, the message(s) may indicate one or more selected communication channels that are to be assessed. The data collection may be performed for all of the communication channels in which wireless device 200 is adapted to operate, or only over a selected subset of channels, perhaps even a single communication channel.

In wireless device 200, data regarding communication channel conditions for wireless device 200 can be gathered by tuning receiver 220 to a communication channel that has been selected to be surveyed, and then operating energy detector 230 to perform an energy measurement to detect the energy present in the communication channel during the measurement period.

The gathered information related to one or more communication channels' availability for communications by wireless devices 120/200 in wireless network 100 is communicated, in whatever form is deemed suitable, to a channel change decision-making device in wireless network 100 in which wireless device 200 is operating. Beneficially, this information is used by the channel change decision-making device to decide whether or not to change one or more communication channels on which wireless network 100 operates and over which wireless devices 120/200 communicate.

Figure 3:
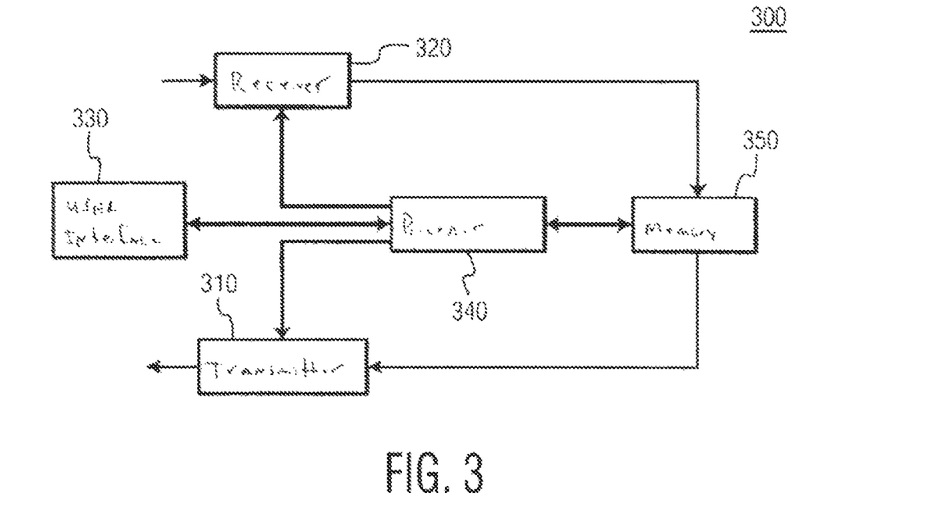
FIG. 3 shows a functional diagram of one embodiment of a device for making channel change decisions for a wireless network.

FIG. 3 shows a functional diagram of one embodiment of a channel change decision-making device 300 for making channel change decisions for a wireless network. In one embodiment, device 300 may be a central node (e.g., a PAN Coordinator 120a) in the wireless network 100. Alternatively, device 300 may be a fixed terminal connected to a PAN Coordinator 120a either by wires or a wireless communication link, including the wireless network 100. That is, device 300 may be an arbitrary node 120 in wireless network 100 that functions as a network manager and makes channel change decisions for the wireless network.

As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Device 300 includes transmitter 310, receiver 320, user interface 330, processor 340, and memory 350.

Processor 340 is configured to execute one or more software algorithms in conjunction with memory 350 to supply data to, to receive data from, and/or to control operations of transmitter 310, receiver 320, and/or user interface 330. Beneficially, processor 340 includes its own memory (e.g., nonvolatile memory) for storing executable software code that allows it to control operations of transmitter 310, receiver 320, and/or user interface 330. Alternatively, executable code may be stored in designated memory locations within memory 350. Also, although processor 340 is shown in FIG. 3 as a distinct element for illustration purposes, in an actual physical realization one or more processors or controllers may be embedded within transmitter 310, receiver 320, and/or user interface 330 and may cooperate with each other to perform operations of wireless device 300, described below as performed by processor 340.

User interface 330 may further include a display device, a keyboard, and a pointing device such as a mouse or trackball. User interface 330 may also comprise executable code stored in memory 350 for execution by processor 340. In one embodiment, user interface may comprise a graphical user interface, and may operate with a standard operating system such as WINDOWS®, MAC® OS, etc. User interface 330 may comprise a "web browser" interface.

In one embodiment, device 300 may be a central node (e.g., PAN Coordinator 120a) in wireless network 100. In another embodiment, device 300 may comprise a dedicated user terminal in communication with the PAN Coordinator 120a, either over the wireless network 100 or even via a dedicated wired connection. Alternatively, device 300 may be an arbitrary node 120 in wireless network 100 that functions as a network manager In yet another embodiment, device 300 may be configured as two or more separate physical units, for example, PAN Coordinator 120a and a physically separate user terminal in communication with the PAN Coordinator 120a, either over the wireless network 100 or even via a dedicated wired connection (in which case, PAN Coordinator 120a includes a transceiver for the dedicated wired connection). In that case, each physical unit may include a corresponding transmitter 310, receiver 320, processor 340, and memory 350. The dedicated terminal may include the user interface 330, and may communicate user input information received via user interface 330 to PAN Coordinator 120a either over the wireless network 100 or even via a dedicated wired connection.

Device 300 is configured to determine whether to change one or more communication channels for the wireless network 100. Beneficially, device 300 makes the channel change decision based on which channel is "optimal", and on the costs involved in changing. It is noted that "optimality" may include the level of probably that an estimate will be wrong to some extent. Beneficially, the algorithm includes a mechanism of indicating what is optimal, i.e., a continuum or discrete states indicating the relative priorities assigned to different channel conditions and different communication performance parameters.

As used herein, "communication performance parameters" are parameters which measure or indicate a relative performance characteristic of wireless network 100, and are contrasted with operating parameters which indicate an operating characteristic of wireless network 100. For example, communication performance parameters include (but are not limited to) bit throughput, message throughput, bit error rate; message error rate; average message latency, maximum message latency for a message, communication range for a wireless device 120, a number of wireless devices 120 which can communicate in wireless network 120, a number of "hops" needed to relay a message from one wireless device 120 to another wireless device 120, etc. In contrast, operating parameters include operating frequencies, transmission power levels, modulation formats, data transmission rates, error correction codes, signal bandwidths, frame formats, system timing, etc.

In one embodiment, wireless network 100 is adapted to operate in a plurality of available operating modes which may be configured to optimize one or more different communication performance parameters for the wireless network 100. Beneficially, user interface 330 allows a user to input user data that causes wireless network 100 to operate in a selected one of the plurality of available operating modes. An operating mode may be selected directly by user input via user interface 330. Alternatively, an operating mode may be automatically selected by device 300 either in response to criteria that are pre-programmed into device 300, or in response to criteria that are input into device 300 as user data via user interface 300. Such criteria may include a time of day, whereby different operating modes are selected at different times of the day. Other criteria may include a type of system for which wireless network 100 is provided. For example, one operating mode may apply when wireless network 100 pertains to a lighting system, another operating mode may apply when wireless network 100 is a video distribution system, etc.

For simplicity of explanation, in the description to follow it will be assumed that device 300 is a PAN Coordinator 120a. Variations in the description in a case where device 300 is embodied differently, as described above, would be easily understood.

In one specific embodiment, wireless network 100 may operate in a "compromise mode," or in a "max usage mode."

In the "compromise mode" PAN Coordinator 120a makes channel change decisions in an attempt to insure that as many wireless devices 120 have at least some minimal capability to communicate with other wireless devices 120 as possible. In that case, PAN Coordinator 120a will attempt to select one or more communication channels to provide some throughput greater than a threshold amount (e.g., 20% of the "normal" throughput level in the absence of any interference) for every node 120, even if there is significant other traffic on the selected channel(s). This mode is useful for systems like lighting and fault status reporting where there is relatively little traffic in total, but all nodes 120 need to be able to communicate messages at some time.

In the "max usage mode" PAN Coordinator 120a makes channel change decisions in an attempt to maximize total traffic throughput for the benefit of applications with high bandwidth requirements, or low latency requirements, etc. In that case, it may be accepted that some nodes 120 may be unable to communicate with other nodes 120 in wireless network 100, but PAN Coordinator 120a aims to provide a fully viable service for as many devices as possible. This mode may be useful during system commissioning, or for high traffic sensor applications (e.g., video surveillance).

Beneficially, each of the available operating modes has associated therewith a different communication channel change determination algorithm uniquely corresponding to that operating mode. The channel change determination algorithms may comprise executable code and may be stored in designated memory locations within memory 350 of device 300. Each communication channel change determination algorithm determines whether to change one or more communication channels over which wireless devices 120 communicate, using the received information related to one or more communication channel's availability for communications by wireless devices 120/200, as explained above.

Accordingly, PAN Coordinator 120a executes a different communication channel change determination algorithm uniquely corresponding to the selected operating mode for wireless network 100. Beneficially, each communication channel change determination algorithm makes the channel change decision in an attempt to "optimize" one or more communication performance parameters pertaining to that operating mode.

In one embodiment, PAN Coordinator 120a is adapted to use a variety of configuration parameters, together with the received information related to one or more communication channel's availability for communications by wireless devices 120/200, in executing an algorithm to determine whether or not to change one or more current channels on which wireless network 100 operates. Such configuration parameters may include, among other things:

information as to whether or not there are legacy devices on the network that are not capable of changing channel, or slow to change channel, or likely to give reports in a specific way, or with specific biases or energy detection information correlations;

indication of a threshold level (of available bandwidth, latencies, reliability, etc) below which a specific application or an application type is non-viable and should be considered not to work indication of a threshold level (of available bandwidth, latencies, reliability, etc) above which an application is known to be able to operate correctly, and beyond which further optimization is deemed to have no significant value;

an indication of which applications are most critical in wireless network 100;

a level of risk that is to be accepted that a new channel may not in fact be better, or could even be substantially worse, than a current channel;

a predicted likelihood that a node 120 may fail based on its environment. If it is known that a node 120 has a high likelihood of failure for some reason, then if the PAN Coordinator 120a does not hear from it, then it is less likely to indicate the problem is due to interference (e.g., knowledge that a whole set of nodes 120 are on the same breaker would be useful and might indicate that if one node 120 went down but the others on that breaker didn't, it's probably not a power failure and so is more likely to be an interference issue; or knowledge that if the battery for a device was recently "good" then probably it's not a power failure; or statistics that the node 120 has been working fine for many years might suggest that it is somewhat less likely to be a node failure; etc.);

information about whether a new wireless network is being installed in the vicinity such that the likelihood of a node 120 losing connectivity is more likely to be due to interference from the new wireless network 120 than from a node failure, and/or information about local facility maintenance and/or known/suspected power outages that would indicate a node 120 losing connectivity is more likely to be due to power failure than interference from another wireless network 120;

information about the type of traffic certain nodes 120, sets of nodes 120 or classes of nodes 120, etc. are expected to be required to carry, e.g., fire alarm nodes 120 should have a channel which permits low latency, high reliability traffic, but doesn't require a channel to be able to support high volumes of data, etc.;

information that a certain node 120 or region of wireless network 100 has particular requirements, e.g.; it's the only node 120 by which a 3rd node 120 may be contacted, or it's a particularly critical node 120 such that extra priority should be given to selecting a channel with conditions suitable for that node 120 or region.

Such information may allow PAN Coordinator 120a to make a better channel change decisions.

Beneficially, some of these configuration parameters may be selected automatically in accordance with a selected operating mode for wireless network 100, as described above.

Alternatively, some or all of these (and other) configuration parameters may be directly selected by a user via user interface 330 and provided to PAN Coordinator 120a for executing a channel change determination algorithm. Table 1 below shows an example of a Configuration Setup Page that may be presented to a user via user interface 330 for a user to select configuration parameters for wireless network 100, or to manually override configuration parameter settings that are otherwise automatically associated with a selected operating mode.

TABLE 1

Configuration setup page

| Option | Tick box to enable |
|---|---|
| Mode: | |
| Compromise mode | Y |
| Max usage mode | |
| Enable advanced settings (below) | Y |
| Advanced settings: | |
| General settings: | |
| Permit channel changing without manual authorization | Y |
| Permit disabling of applications on our own network to assess residual traffic on this channel | |
| Permit splitting network over multiple channels | |
| Legacy device support settings: | |
| Network has legacy devices (ZigBee 1.0 and after) | |
| Network has legacy devices (ZigBee 1.1 and after) | Y |
| Vendor variation settings: | |
| Use manufacturer ED scan dBm variations database | Y |
| Use manufacturer implementation variations database | Y |
| Wait after channel change | Y |
| Application optimizations: | |
| Use table of applications known to be operating on this network | Y |
| Determine applications operating on this network automatically from discovery information | Y |
| Use table of application requirements for available bandwidth | Y |
| Use table of application requirements for latency | Y |
| Use table of application requirements for reliability | Y |
| Use table of application requirements for throughput | Y |
| Use table of levels below which applications are non-viable | Y |
| Use table of levels above which applications are known to operate correctly | Y |
| Optimize for selected core application only | Y |
| Use table of prioritization of applications | |
| Manual override for specific applications: | |
| Override to favor "occasional use" applications | |
| Override to favor "high volume traffic" applications, e.g.: for commissioning | |
| When to change settings: | |
| Use user defined minimum change time settings | |
| Favor changing to a better channel where possible | |
| Favor staying on the same channel where possible | |
| Use preset schedule to determine whether to favor changing channel or staying on the same channel | Y |
| Use user defined schedule to determine whether to favor changing channel or staying on the same channel | |
| Use occupancy related user defined schedule to determine whether to favor changing channel or staying on the same channel | |
| Avoid changing to a new channel if the channel conditions information is incomplete and there is a strong risk that the new channel may be substantially less good than indicated. | Y |
| Topology specific optimizations: | |
| Assess topology and prioritize nodes on critical paths | Y |
| Use table of critical nodes | Y |
| Use table of critical applications to automatically determine critical nodes | Y |
| Handing nodes failing to report channel conditions: | |
| Use breaker map to determine likelihood of failure to report due to power failure | Y |
| Use battery history to determine likelihood of failure to report due to battery failure | Y |
| Use history table to determine likelihood of failure to report due to node failure | Y |
| Use node failure statistics information to determine likelihood of failure to report due to node failure | Y |
| Local power issues reported | |
| Known power failure/downtime | |

TABLE 1-continued

Configuration setup page

| Option | Tick box to enable |
|---|---|
| Local wireless networking installation activity reported | |
| Local major building/office renovation activity expected on site | |
| Select WiFi database assumptions: | |
| Assume WiFi planning for Americas | Y |
| Assume WiFi planning for Europe | |

Many configuration parameters listed in Table 1 might benefit from a range of settable values, or indeed a whole table of values. In that case, Table 2 below illustrates a possible detailed implementation of the item in Table 1 denoted "Use manufacturer Energy Detection scan dBm variations database," whereby a PAN Coordinator 120a can be supplied with normalization information for energy detection scans.

TABLE 2

ED scan normalization

| Manufacturer ID Scan value | X | Y Energy dBm | Z |
|---|---|---|---|
| 0x00 | −60.10 | −62.10 | −55.30 |
| 0x01 | −59.90 | −61.88 | −55.14 |
| 0x02 | −59.71 | −61.67 | −54.99 |
| 0x03 | −59.51 | −61.45 | −54.83 |
| ... | ... | ... | ... |
| 0xfe | −10.49 | −7.32 | −15.61 |
| 0xff | −10.30 | −7.10 | −15.46 |

Table 2 illustrates a simple example of the more general case where information about wireless devices 120 from different manufacturers (or different versions of different stacks from different manufacturers) are known to have different characteristics, in this case specifically that the values reported by an energy detection scan are not defined by the wireless network specification or a standards document, but are manufacturer dependent, and here assumed to be consistent across all products from a single manufacturer.

Meanwhile, Table 3 below shows a possible mapping of latency requirements to specific application types existing in wireless network 100. Application types might be discovered by the PAN Coordinator 120a over the wireless network 100 and matched to a discovery ID, which in turn might map to a profile ID or "device type", etc.

TABLE 3

Application requirements for latency

| application type | fire alarms | light switches | backup medium |
|---|---|---|---|
| application discovery ID | 0x0911 | 0x0001 | 0x1234 |
| optimal latency requirement (ms) | 50 | 100 | 1000 |
| critical latency requirement (ms) | 100 | 250 | none |

Figure 4:
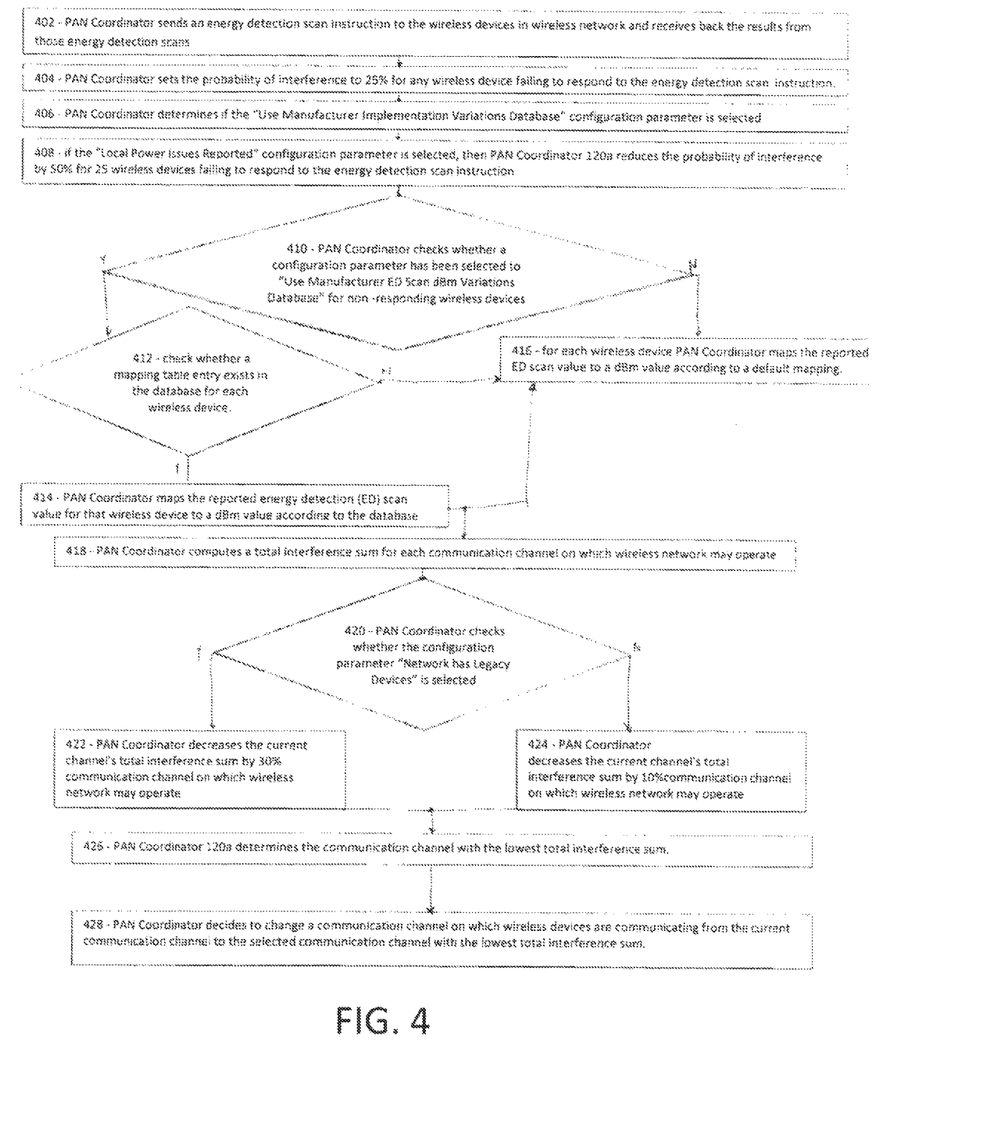
FIG. 4 shows a flowchart of one embodiment of a method of determining whether to change one or more communication channels being used in a wireless network.

FIG. 4 illustrates one exemplary embodiment of one channel change determination algorithm which employs various configuration parameters (which may be supplied via user interface 330) and which algorithm may be executed by channel change decision-making device 300.

For simplifying the explanation, in the description below it is assumed that device 300 comprises PAN Coordinator 120a.

In a first step 402, PAN Coordinator 120a sends an energy detection scan instruction to the wireless devices 120/200 in wireless network 100 and receives back the results from those energy detection scans.

In a step 404, PAN Coordinator 120a sets the probability of interference to 25% for any wireless device 120/200 failing to respond to the energy detection scan instruction.

In a step 406, PAN Coordinator 120a determines if the "Use Manufacturer Implementation Variations Database" configuration parameter is selected. If so, then if the manufacturer's mean time between failures (MTBF)>100,000 hours for a wireless device 120/200 failing to respond to the energy detection scan instruction, PAN Coordinator 120a sets the probability of interference to 75% for wireless devices 120/200.

In a step 408, if the "Local Power Issues Reported" configuration parameter is selected, then PAN Coordinator 120a reduces the probability of interference by 50% for wireless devices 120/200 failing to respond to the energy detection scan instruction.

In a step 410, PAN Coordinator 120a checks whether a configuration parameter has been selected to "Use Manufacturer ED Scan dBm Variations Database" for wireless devices 120/200 that did respond to the energy detection scan instruction.

If so, then in step 412, it is checked whether a mapping table entry exists in the database for each wireless device 120. If so, then in a step 414, PAN Coordinator 120a maps the reported energy detection (ED) scan value for that wireless device 120 to a dBm value according to the database. Where no mapping table entry exists for a wireless device 120, then in step 416 PAN Coordinator 120a maps the reported ED scan value to a dBm value according to a default mapping.

If the configuration parameter "Use Manufacturer ED Scan dBm Variations Database" is not selected, then in the step 416, for each wireless device 120/200, PAN Coordinator 120a maps the reported ED scan value to a dBm value according to a default mapping.

In a step 418, PAN Coordinator 120a computes a total interference sum for each communication channel on which wireless network 100 may operate by adding: (1) 100% for nodes 120 reporting interference >=30 dBm; (2) 0% for nodes 120 reporting interference <30 dBm; and (3) the value determined in the steps above for nodes 120 that did not respond to the ED scan instruction.

In a step 420, PAN Coordinator 120a checks whether the configuration parameter "Network has Legacy Devices" is selected. If so, in a step 422, PAN Coordinator 120a decreases the current channel's total interference sum by 30% to more strongly favor not changing a current communication channel. Otherwise, in a step 424, PAN Coordinator 120a decreases the current channel's total interference sum by 10% to slightly favor not changing a current communication channel.

Then, in a step 426, PAN Coordinator 120a determines the communication channel with the lowest total interference sum.

Finally, in a step 428, if the communication channel with the lowest interference sum is different from a current communication channel, then PAN Coordinator 120a decides to change a communication channel on which wireless devices 120/200 are communicating from the current communication channel to the selected communication channel with the lowest total interference sum.

A variety of similar algorithms for making a channel change decision may be provided depending for different operating modes available for wireless network 100. While preferred embodiments are disclosed herein, many variations are possible which remain within the concept and scope of the invention. Such variations would become clear to one of ordinary skill in the art after inspection of the specification, drawings and claims herein. For clarity and concreteness of explanation, examples have been provided above in the context of a ZigBee wireless PAN, and IEEE Standard 802.15.4-2003. However, while the features disclosed above have particular benefit and efficacy in the context of a ZigBee wireless PAN, it should be understood that the principles are expansive and can be applied appropriately to a variety of communication systems and communication devices, using a variety of lower layer specifications and standards, including, for example, WiFi networks, Bluetooth Scatternets, etc. Such applications would be well understood by one of skill in the art upon review of the specification and drawings of this application. The invention therefore is not to be restricted except within the scope of the appended claims

What is claimed is:

1. In a communication network comprising a plurality of wireless devices which communicate over a specified number of communication channels in a defined portion of a frequency spectrum, and a method of determining whether to change one or more communication channels over which the wireless devices communicate, the method comprising:

receiving an indication of a selected operating mode for the communication network among a plurality of available operating modes, each operating mode having associated therewith a different communication channel change determination algorithm uniquely corresponding to that operating mode;

receiving information related to one or more communication channel's availability for communications by one or more of the wireless devices; and determining whether to change one or more communication channels over which the wireless devices communicate by executing the communication channel change determination algorithm corresponding to the selected operating mode, using the received information related to one or more communication channel's availability for communications by one or more of the wireless devices.

2. The method of claim 1, wherein the indication of the selected operating mode is received from a user via a user interface associated with the communication network.

3. The method of claim 1, wherein the indication of the selected operating mode is a current time that automatically selects the operating mode.

4. The method of claim 1, wherein the indication of the selected operating mode is an alarm signal that automatically selects the operating mode.

5. The method of claim 1, wherein the communication channel change determination algorithm compares a communication quality parameter determined from the received information related to one or more communication channel's availability for communications by one or more of the wireless devices to a threshold value, and determines whether to change one or more communication channels over which the wireless devices communicate based at least in part on a result of the comparison.

6. The method of claim 1, further comprising automatically executing a communication channel change determination algorithm when it is determined to change one or more communication channels over which the wireless devices communicate.

7. The method of claim 1, further comprising providing an indication to a user to manually initiate a communication channel change determination algorithm when it is determined to change one or more communication channels over which the wireless devices communicate.

8. The method of claim 1, wherein the available operating modes comprise:

a first operating mode which selects a new communication channel that maximizes a number of the wireless devices in the communication network which have communication capability over the communication channel; and a second operating mode which selects a new communication channel that maximizes a total data throughput capability of the communication network.

9. The method of claim 1, wherein at least one of the communication channel change determination algorithms only determines that a communication channel should be changed when the information related to one or more communication channel's availability for communications by one or more of the wireless devices indicates that a new channel improves a communication performance parameter for the communication network more than a threshold amount or percentage.

10. The method of claim 9, wherein the performance parameter is a number of the wireless devices in the communication network which have communication capability over the communication channel greater than a minimum threshold.

11. The method of claim 9, wherein the performance parameter is a total data throughput for the communication network.

12. The method of claim 9, wherein the performance parameter is one of: (a) a total number of hops required to communicate data from each one of the wireless devices to each other wireless device over the communication network; (b) a maximum number of hops required to communicate data from any one of the wireless devices to any other wireless device over the communication network; and (c) a maximum number of hops required to communicate data from any one of the wireless devices to a network management device over the communication network.

13. The method of claim 1, wherein at least one of the communication channel change determination algorithms determines whether to change one or more communication channels over which the wireless devices communicate based on whether the communication network includes any legacy wireless devices which operate with limited capabilities as compared with other wireless devices in the communication network.

14. The method of claim 1, wherein at least one of the communication channel change determination algorithms determines whether to change one or more communication channels based on whether a current communication channel satisfies a data latency requirement for wireless devices of the communication network.

15. The method of claim 14, wherein the data latency requirement is determined based on one or more application types existing in the communication network selected among a plurality of application types supported by the communication network.

16. The method of claim 15, wherein the one or more application types are selected by a user via a user interface associated with the communication network.

17. In a communication network having a plurality of wireless devices which communicate over a specified number of communication channels in a defined portion of a frequency spectrum, and a device for determining whether to change one or more communication channels over, the device for determining whether to change one or more communication channels comprising:

a micro-processor to receive an indication of a selected operating mode for the communication network among a plurality of available operating modes for respective data traffic, each operating mode having associated therewith a different communication channel change determination algorithm uniquely corresponding to that operating mode, receive information related to one or more communication channel's availability for communications by one or more of the wireless devices and determine whether to change one or more communication channels over which the wireless devices communicate by executing the communication channel change determination algorithm corresponding to the selected operating mode, using the received information related to one or more communication channel's availability for communications by one or more of the wireless devices.

* * * * *